(12) United States Patent
Jin et al.

(10) Patent No.: US 12,291,646 B2
(45) Date of Patent: May 6, 2025

(54) PHOTOCURABLE (METH)ACRYLATE COMPOSITIONS

(71) Applicant: Henkel AG & Co. KGaA, Duesseldorf (DE)

(72) Inventors: Shuhua Jin, Cheshire, CT (US); Chih-Min Cheng, Westford, MA (US)

(73) Assignee: Henkel AG & Co. KGAA, Duesseldorf (DE)

( * ) Notice: Subject to any disclaimer, the term of this patent is extended or adjusted under 35 U.S.C. 154(b) by 553 days.

(21) Appl. No.: 17/654,613

(22) Filed: Mar. 14, 2022

(65) Prior Publication Data

US 2022/0204809 A1 Jun. 30, 2022

Related U.S. Application Data

(63) Continuation of application No. PCT/US2020/051644, filed on Sep. 18, 2020.

(60) Provisional application No. 62/902,659, filed on Sep. 19, 2019.

(51) Int. Cl.
| | | |
|---|---|---|
| C09D 175/14 | (2006.01) | |
| B01D 67/00 | (2006.01) | |
| B01D 69/02 | (2006.01) | |
| B01D 69/12 | (2006.01) | |
| B01D 71/52 | (2006.01) | |
| B01D 71/54 | (2006.01) | |
| C09D 7/43 | (2018.01) | |
| C09D 7/65 | (2018.01) | |
| B01D 61/02 | (2006.01) | |

(52) U.S. Cl.
CPC ....... C09D 175/14 (2013.01); B01D 67/0088 (2013.01); B01D 69/02 (2013.01); B01D 69/12 (2013.01); B01D 71/5211 (2022.08); B01D 71/54 (2013.01); C09D 7/43 (2018.01); C09D 7/65 (2018.01); B01D 61/025 (2013.01); B01D 2325/30 (2013.01)

(58) Field of Classification Search
USPC .................................................. 522/90, 97
See application file for complete search history.

(56) References Cited

U.S. PATENT DOCUMENTS

| | | | | |
|---|---|---|---|---|
| 4,254,230 A | * | 3/1981 | Howard ............... | C08G 18/671 525/28 |
| 4,258,123 A | | 3/1981 | Nagashima et al. | |
| 4,439,600 A | * | 3/1984 | Moran, Jr. ......... | C08G 18/8175 528/392 |
| 4,505,793 A | | 3/1985 | Tamoto et al. | |
| 4,693,953 A | * | 9/1987 | Torikai ................. | G01N 27/423 430/326 |
| 5,094,749 A | * | 3/1992 | Seita ..................... | B01D 69/00 210/321.75 |
| 5,395,862 A | | 3/1995 | Neckers et al. | |
| 5,451,343 A | | 9/1995 | Neckers et al. | |
| 5,545,676 A | | 8/1996 | Palazzotto et al. | |
| 8,933,146 B2 | * | 1/2015 | Sommer ............... | C08G 18/12 525/131 |
| 8,993,897 B2 | * | 3/2015 | Sekito .................... | G03F 7/038 428/323 |
| 9,238,221 B2 | * | 1/2016 | Van Berchum ....... | C02F 1/4695 |
| 9,718,910 B2 | * | 8/2017 | Otani ..................... | C08F 299/02 |
| 10,213,743 B2 | * | 2/2019 | Van Berchum ...... | C09D 11/101 |
| 10,633,499 B2 | * | 4/2020 | Van Engelen ....... | B01D 61/485 |
| 2004/0011429 A1 | | 1/2004 | Bradford et al. | |
| 2008/0159706 A1 | | 7/2008 | Andre et al. | |
| 2009/0012202 A1 | | 1/2009 | Jacobine et al. | |
| 2011/0097645 A1 | * | 4/2011 | Van Baak ............. | B01D 61/44 204/632 |
| 2012/0094184 A1 | * | 4/2012 | Abe ....................... | H01G 9/02 429/251 |
| 2012/0276373 A1 | | 11/2012 | Port et al. | |
| 2013/0103157 A1 | * | 4/2013 | Kourtis ................. | A61L 24/06 206/568 |
| 2015/0166704 A1 | | 6/2015 | Otani et al. | |
| 2018/0320021 A1 | | 11/2018 | Potzmann | |
| 2019/0284430 A1 | * | 9/2019 | Sigel ..................... | C09D 7/63 |

FOREIGN PATENT DOCUMENTS

| | | | | | |
|---|---|---|---|---|---|
| CA | 2610961 A1 | * | 1/2017 | | |
| CN | 1206472 A | * | 1/1999 | .......... | C03C 25/106 |
| CN | 001896156 | | 1/2007 | | |
| CN | 105801807 | | 7/2016 | | |
| CN | 107921373 A | | 4/2018 | ............ | B01D 61/44 |
| EP | 0369645 | | 5/1990 | | |
| EP | 0563925 | | 10/1993 | | |
| JP | 08060043 | | 3/1996 | | |
| WO | WO-2011027138 A1 | * | 3/2011 | ......... | B01D 67/0006 |
| WO | 2013114297 | | 8/2013 | | |
| WO | WO-2015110827 A1 | * | 7/2015 | .......... | B01D 61/243 |

OTHER PUBLICATIONS

PCT International Search Report issued in connection with International Application No. PCT/US2020/051644 mailed Jan. 22, 2021.
PCT International Search Report issued in connection with International Application No. PCT/US2020/051652 mailed Dec. 30, 2020.

* cited by examiner

*Primary Examiner* — Sanza L. McClendon
(74) *Attorney, Agent, or Firm* — Steven C. Bauman

(57) ABSTRACT

Photocurable (meth)acrylate compositions for forming features on the surfaces of membranes, and particularly, on membranes used in osmosis and reverse-osmosis applications, such as membrane filters.

26 Claims, No Drawings

PHOTOCURABLE (METH)ACRYLATE COMPOSITIONS

BACKGROUND

1. Field

The present invention relates to curable (meth)acrylate compositions comprising polyether urethane acrylate and an organic filler and methods of preparation and use of such compositions. More particularly, the present invention relates to photocurable (meth)acrylate compositions for forming features on the surfaces of membranes, and particularly with membranes used in osmosis and reverse-osmosis applications, such as membrane filters.

2. Brief Description Related Technology

Curable compositions have been used widely for sealing, adhesive, coating and potting applications, to name a few. The choice of the type backbones and curable groups is generally selected with reference to the specific end use application and the environment in which it is intended to be used. Polymers having various degrees of unsaturated groups, as well as other functionally crosslinking groups have been used.

For reverse osmosis (RO) membrane bonding and spacing, commonly used adhesives (i.e., curable compositions) are two-part room temperature curing polyurethane or epoxy. The two parts must be mixed and applied before gel time to form parts, which is not desirable for some applications. Light cure acrylates containing a (meth)acrylate-terminated polybutadiene have been disclosed for membrane fold protection, but bonding to membranes was not reported. Polybutanediene acrylate oligomers generally have low adhesion to many substrates. Light cure acrylate containing polyether urethane acrylate resins are known to have good hydrolytically stability, but bonding to RO membranes is challenging in alkaline solutions.

Even if adequate adhesion between the curable composition and membrane surface is initially achieved, materials adhered to membrane surfaces, e.g., spacer features, are required to maintain good adhesion to the membrane after curing and during use and maintenance of the membrane. Use and maintenance of, for example, RO membranes require that the membrane surface and the features/spacers adhere thereto be exposed to an aqueous environment. In particular, cleaning of the membranes often requires exposure of the membrane to acidic and basic aqueous solutions. The features formed by the cured composition may face degradation when in contact with water, particularly under acidic and alkaline solutions, causing loss of mass, mechanical strength, and adhesion to membrane during use and maintenance.

There is a need for a photocurable (meth)acrylate composition and a process of using such composition to form hydrolytically stable features on the membrane surface, which allows for good adhesion of the cured composition to a membrane surface, as well as maintenance of good adhesion, mass, and mechanical strength of the cured composition during subsequent use and maintenance of the membrane.

SUMMARY

The present invention provides a photocurable composition including: a) a (meth)acrylate-functionalized polyether urethane component; b) a (meth)acrylate monomer; c) an organic filler; and d) a photoinitiator, wherein when exposed to UV or visible light the curable composition forms a cured reaction product, the cured reaction product demonstrates a loss of mass of: 1) less than 2% when exposed to acidic, aqueous (pH=1.5) conditions for about 4 weeks at a temperature of about 50° C. and/or 2) less than 3% when exposed to basic, aqueous (pH=12.5) conditions for about 4 weeks at a temperature of about 50° C.

In another aspect of the present invention, there is provided a composite membrane structure including: a) a membrane comprising at least one surface; and b) the cured reaction product of the curable composition described above disposed on at least a portion of the at least one surface of the membrane.

In a further aspect of the present invention, there is provided a method of a producing a hydrolytically stable cured reaction product comprising the steps of: a) providing a curable composition including: i) a (meth)acrylate-functionalized polyether urethane component; ii) a (meth)acrylate monomer; iii) an organic filler; and iv) a photoinitiator, and b) exposing the curable composition to a source of UV or visible light to form a cured reaction product, wherein hydrolytic stability is demonstrated when the cured reaction product demonstrates a loss of mass of: 1) less than 2% when exposed to acid, aqueous (pH=1.5) conditions for about 4 weeks at a temperature of about 50° C. or 2) less than 3% when exposed to basic, aqueous (pH=12.5) conditions for about 4 weeks at a temperature of about 50° C.

DETAILED DESCRIPTION

The present invention is directed to photocurable (meth) acrylate compositions, which include: a) a (meth)acrylate-functionalized polyether urethane component; b) a (meth) acrylate monomer; c) an organic filler; and d) a photoinitiator, wherein when exposed to UV or visible light the curable composition forms a cured reaction product, the cured reaction product demonstrates a loss of mass of: 1) less than 2% when exposed to acidic, aqueous (pH=1.5) conditions for about 4 weeks at a temperature of about 50° C. and/or 2) less than 3% when exposed to basic, aqueous (pH=12.5) conditions for about 4 weeks at a temperature of about 50° C.

As used herein "hydrolytically stable" means that the cured reaction product is resistant to chemical decomposition in the presence of water. This hydrolytic stability is important, particularly in RO membrane applications, because during use and maintenance of such composite membrane structures, the cured reaction product is exposed (often continuously) to aqueous conditions. Moreover, depending on the specific use of the membrane, the cured reaction product may be exposed to highly acidic and highly basic conditions. For example, cleaning or reconditioning of RO membrane filters comprises application of caustic solutions to remove residue and debris trapped in the spacer elements (i.e., the features formed by the cured reaction product). Accordingly, the hydrolytic stability of the cured reaction product may be critical to extending the life of these membrane elements and reducing costs associated with their frequent replacement.

In an aspect of the present invention, the hydrolytic stability of the cured reaction product is demonstrated when the cure reaction product demonstrates a minimal loss of mass when exposed to aqueous conditions, such as aqueous solutions. As used herein, a "minimal loss of mass" means a loss of less than 5%, less than 4%, less than 3%, less than 2.5%, less than 2%, less than 1.5%, less than 1%, or less than 0.5% when exposed to aqueous conditions for an extended period of time at an elevated temperature. As used herein, an "extended period of time" means about 0.5 week, about 1 week, about 2 weeks, about 3 weeks, about 4 weeks, about 5 weeks, or about 6 weeks. As used herein, an "elevated temperature" means about 30° C. or greater, about 35° C. or greater, about 40° C. or greater, about 45° C. or greater, about 50° C. or greater, about 55° C. or greater, about 60° C. or greater, or about 70° C. or greater.

In aspects of the present invention aqueous conditions may include acidic, aqueous conditions, basic, aqueous conditions, and neutral, aqueous conditions. As used herein, "acidic, aqueous conditions" means aqueous conditions with a pH of about 3 or less, about 2.5 or less, about 2 or less, about 1.5 or less, or about 1 or less. As used herein, "basic, aqueous conditions" means aqueous conditions with a pH of about 11 or greater, about 11.5 or greater, about 12 or greater, about 12.5 or greater, or about 13 or greater. As used herein, "neutral, aqueous conditions" means aqueous conditions with a pH between about 6 and about 8 or with a pH of about 7.

In one aspect of the present invention the hydrolytic stability of the cured reaction product is demonstrated when the cure reaction product demonstrates a loss of mass of: 1) less than 2% when exposed to acidic, aqueous (pH=1.5) conditions for about 4 weeks at a temperature of about 50° C. and/or 2) less than 3% when exposed to basic, aqueous (pH=12.5) conditions for about 4 weeks at a temperature of about 50° C.

In an aspect of the present invention, the cured reaction product has a Shore D hardness of about 20 or greater, preferably about 20 to about 70 or about 40 to about 60.

In an aspect of the present invention, the curable composition has a viscosity of about 10,000 to about 100,000 or about 20,000 to about 80,000 centipoise (at 25° C., 10 s$^{-1}$).

In an aspect of the present invention, the curable composition has an optimized rheology that is effectively balanced to allow for sufficient thixotropy to allow for ease of deposition, and yet, maintain its physical structure after deposition and prior to cure. As used herein, "thixotropy" means that the substance becomes less viscous when stress (for example mixing or shaking) is applied and is more viscous when free of such stress (e.g., under static conditions).

In a further aspect of the present invention, the curable composition has a thixotropic index of about 1.5 to about 6 or from about 1.5 to about 5. As used herein, the "thixotropic index" means the ratio of the viscosity (in centipoise) of the curable composition at a speed of 1 s$^{-1}$ to the viscosity (in centipoise) of the curable composition at a speed of 10 s$^{-1}$ (viscosity at 1 s$^{-1}$/viscosity at 10 s$^{-1}$). The viscosity may be determined using known methods, for example, cone and plate rheometer, parallel plate rheometer, or rotation viscometer, such as Brookfield viscometer.

In an aspect of the present invention, the (meth)acrylate-functionalized polyether urethane component is a polyether urethane acrylate oligomer. Suitable polyether urethane acrylate oligomers include, but are not limited to, aliphatic urethane acrylates. Examples of suitable polyether urethane acrylate oligomers include, Ebecryl 264, 265, 270, 1258, 4100, 4200, 4220, 4265, 8807, 8810 and 8800-20R (all from Allnex), BR-14B, BR-302, BR-344, BR-345, BR-372, BR-543, BR-571, BR-582, BR 582E8, BR-930D, BR-3042 and BR-3471 (all from Dymax), Genomer 4230, 4217, (all from Rahn), CN 9004, 9005, 959, 989, 996 and 980 (all from Sartomer). Some other polyether urethane acrylates from urethane acrylate manufacturers such as IGM, Evonik and Kowa may also be used.

In an aspect of the present invention, the urethane acrylate oligomer is A polyethylene glycol diacrylate (we don't know the exact structure of the polyether urethane acrylate) or a combination thereof.

In a further aspect of the present invention, the (meth)acrylate-functionalized polyether urethane component is present in an amount of about 20% to about 60% by weight or about 30% to about 50% by weight based on the total weight of the curable composition.

Suitable (meth)acrylate monomers include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate. In an aspect of the present invention, the (meth)acrylate monomer is polyethylene glycol diacrylate, such as SR 259 (polyethylene glycol (200) diacrylate from Sartomer). Suitable multifunctional (meth)acrylates include polyethylene glycol di (meth)acrylates, desirably triethyleneglycol di(meth)acrylate, hydroxypropyl(meth)acrylate, bisphenol-A di(meth)acrylates, such as ethoxylated bisphenol-A (meth)acrylate ("EBIPA" or "EBIPMA"), and tetrahydrofurane (meth)acrylates and di(meth)acrylates, citronellyl acrylate and citronellyl methacrylate, hexanediol di(meth)acrylate ("HDDA" or "HDDMA"), trimethylol propane tri(meth)acrylate, tetrahydrodicyclopentadienyl(meth)acrylate, ethoxylated trimethylol propane triacrylate ("ETTA"), triethylene glycol diacrylate and triethylene glycol dimethacrylate ("TRIEGMA"). In an aspect of the present invention, the (meth)acrylate monomer is monofunctional or difunctional acrylate, or a combination thereof.

In an aspect of the present invention, the (meth)acrylate monomer is present in an amount of about 10% to about 60% by weight or about 20% to about 40% by weight based on the total weight of the curable composition.

In a further aspect of the present invention, the (meth) acrylate monomer has a viscosity of less than about 1,000 cps or less than about 500 cps.

In aspect of the present invention, the organic fillers include hydrophobic polyolefin-based organic thickeners, thermoplastic polymers such as polyvinylacetate, polyolefine, nylon fibers, and combinations thereof. Suitable organic fillers include polyvinylchloride powder, polypropylene powder, or a combination thereof.

In an aspect of the present invention, the organic filler is present in an amount of about 5% to about 50% by weight or about 15% to about 40% based on the total weight of the curable composition.

In aspects of the present invention the curable composition is a photocurable or light curable composition, i.e., curable using light such as visible or ultraviolet light (UV). In aspects of the present invention, the curable composition may be cured using a light source, such as a bulb or LED that produces visible or UV light.

In an additional aspect of the present invention, the photoinitiator, may be a UV initiator, a visible initiator, or a combination of UV and visible initiators. In one aspect of the present invention, the photoinitiator is a polymeric structure to which is attached at least one chromophore that is excited by radiation in the UV light or visible light range.

A variety of UV initiators may be employed. UV initiators are generally effective in the 200 to 400 nm range, and particularly in the portion of the spectrum that borders on the invisible light and the visible portion just beyond this, e.g. >200 nm to about 390 nm.

Initiators that will respond to UV radiation to initiate and induce curing of the (meth)acryl functionalized curable component, which are useful in the present invention include, but are not limited to, benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof.

Examples of such UV initiators include initiators available commercially from IGM Resins under the "OMNIRAD" (formerly "IRGACURE") and "DAROCUR" tradenames, specifically "OMNIRAD" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide], and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and 2,4,6-trimethylbenzoyldiphenylphosphine oxide (commercially available as LUCIRIN TPO from BASF Corp.). Of course, combinations of these materials may also be employed herein. Of course, it is understood that some of these photoinitiators categorized herein as UV photoinitiators have a tailing absorption into the visible range, and thus straddle the line between UV and visible light cure initiators, but nonetheless are included herein as part of the invention.

Initiators suitable for use in the present invention that will respond to visible light to initiate and induce curing include, but are not limited to, camphorquinone peroxyester initiators, 9-fluorene carboxylic acid peroxyesters, visible light [blue] photoinitiators, dl-camphorquinone, "IRGACURE" 784DC (photoinitiator based on substituted titanocenes), and combinations thereof.

Other suitable photoinitiator systems include those disclosed in each of the following patents or publications, each of which is incorporated by reference herein in its entirety.

U.S. Pat. No. 4,505,793 to Tamoto et al., which is incorporated by reference herein, discloses photopolymerization initiators that include a combination of a 3-keto-substituted cumarin compound and an active halogeno compound. A number of exemplary compounds are disclosed. Such photopolymerization initiators cure by exposure to light having wavelengths ranging between about 180 nm and 600 nm.

U.S. Pat. No. 4,258,123 to Nagashima et al., which is incorporated by reference herein, discloses photosensitive resin compositions including initiator components that generate a free radical upon irradiation with actinic light. Such components include various triazine compounds, as more fully described therein.

Additional useful components are disclosed in the following document, which is incorporated herein by reference. European Patent Publication No. EP 0 369 645 A1 discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

Additional useful components are disclosed in the following document, which is incorporated herein by reference. European Patent Publication No. EP 0 563 925 A1 discloses photopolymerization initiators including a sensitizing compound that is capable of absorbing radiation in the range of about 250-1000 nm and 2-aryl-4,6-bis(trichloromethyl)-1,3, 5-triazine. Exemplary sensitizing compounds that are disclosed include: cyanine dye, merocyanine dye, coumarin dye, ketocoumarin dye, (thio)xanthene dye, acridine dye, thiazole dye, thiazine dye, oxazine dye, azine dye, aminoketone dye, squarylium dye, pyridinium dye, (thia)pyrylium dye, porphyrin dye, triaryl methane dye, (poly)methane dye, amino styryl compounds and aromatic polycyclic hydrocarbons. These photopolymerization initiators are sensitive to UV and visible light.

U.S. Pat. No. 5,395,862 to Neckers et al., which is incorporated by reference herein, discloses fluorone photoinitiators, which are sensitive to visible light. Such fluorone initiator systems also include a coinitiator, which is capable of accepting an electron from the excited fluorone species. Exemplary coinitiators are disclosed, including: onium salts, nitrohalomethanes and diazosulfones. U.S. Pat. No. 5,451,343 to Neckers et al., which is incorporated herein by reference, discloses fluorone and pyronin-Y derivatives as initiators that absorb light at wavelengths of greater than 350 nm. U.S. Pat. No. 5,545,676 to Palazzotto et al., which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts. Exemplary sensitizers and electron donors for use in the three-part system also are disclosed. Additionally, the sensitizer is capable of absorbing light in the range of about 300-1000 nm.

In a further aspect of the present invention, the Photoinitiator is present in an amount of about 0.2% to about 5% by weight or about 1% to about 3% by weight based on the total weight of the curable composition.

In an additional aspect of the present invention, the curable composition may further include an inorganic filler which are stable in acid and basic solutions. Inorganic fillers include fumed silica. Silane treated fumed silica, silicate, aluminium silicae, zirconium silicate, feldspar, ferromagnetics, fly ash, glass fibers, jute fiber, mica, quartz, titanium dioxide, and combinations thereof.

In an aspect of the present invention, the inorganic filler is present in amounts of about 0.1% to about 40% or about 1% to about 10% by weight based on the total weight of the curable composition.

Optional additives, such as co-initiators, stabilizers, rheology modifiers, defoamers, inhibitors, oxygen scavenging agents, dyes, colors, pigments, adhesion promoters, plasticizers, toughening agents, reinforcing agents, fluorescing agents, wetting agents, antioxidants, and combinations thereof also may be included in the compositions of the present invention.

The present invention is also directed to a composite membrane structures, which include: a) a membrane comprising at least one surface and b) the cured reaction product of the curable composition described above disposed on at least a portion of the at least one surface of the membrane.

The present invention is further directed to methods of a producing a hydrolytically stable cured reaction product, which include the steps of: a) providing a curable composition including: i) a (meth)acrylate-functionalized polyether urethane component; ii) a (meth)acrylate monomer; iii) an organic filler; and iv) a photoinitiator, and b) exposing the curable composition to a source of UV or visible light to form a cured reaction product, wherein hydrolytic stability is demonstrated when the cured reaction product demonstrates a loss of mass of: 1) less than 2% when exposed to acid, aqueous (pH=1.5) conditions for about 4 weeks at a temperature of about 50° C. or 2) less than 3% when exposed to basic, aqueous (pH=12.5) conditions for about 4 weeks at a temperature of about 50° C.

In another aspect of the composite membrane structure of the present invention, the cured reaction product is adhesively bonded to at least a portion of the at least one surface of the membrane.

In another aspect of the composite membrane structure of the present invention, the cured reaction product is disposed on at least a portion of the at least one surface of the membrane in a pre-determined pattern. In embodiments of the composite membrane structure of the present invention, the pre-determined pattern is selected from the group consisting of stripes, waves, circles, ovals, arcs, squares, rectangles, diamonds, pentagons, hexagons, stars, chevrons, a random pattern, and combinations thereof.

In an aspect of the present invention, the pattern is formed on membrane surface by known methods, such as printing or deposition of the curable composition on the membrane surface followed by curing of the curable composition. The pattern formed on the membrane surface by the methods of the present invention are typically composed numerous features formed from the cured reaction product. Generally, these features have physical characteristics that make them suitable for providing spacing between overlaid layers of the membrane. For example, the features may provide adequate spacing between layers of a spiral reverse osmosis filtering membrane to optimize the operation, cleaning, and lifespan of reverse osmosis membrane elements employing membranes with these features. In an aspect of the present invention, the pattern of features may have a size and shape sufficient to maintain adequate membrane spacing and to expose sufficient membrane surface to ensure efficient operation of the membrane.

The surface upon which the curable composition is deposited may include the surface of any membrane suitable for application of the curable composition. In an aspect of the present invention, the surface upon which the curable composition is deposited is a membrane surface. As used herein, a "membrane" means a selective barrier that allows passage of some substances but prevents passage of other substances. In an aspect of the present invention, the membrane is a filter membrane, i.e., a membrane for filtering substances out of a liquid carrier, such as water. Filter membranes include reverse osmosis membranes, forward osmosis membranes, microfiltration membranes, ultrafiltration membranes, and nanofiltration membranes. Features composed of the cured composition may be deposited on the active surface of the membrane, or on the non-active surface of the membrane, or both.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

EXAMPLES

Materials
The following ingredients were employed in the examples described below in Table 1:

TABLE 1

| Ingredient Name | Class | Supplier |
| --- | --- | --- |
| Polyester Urethane Acrylate A (Proprietary) | Polyester Urethane Acrylate | Henkel |
| CN9024 | Polyester Urethane Acrylate | Sartomer |
| CN991 | Polyester Urethane Acrylate | Sartomer |
| CN9167US | Polyether Urethane Acrylate | Sartomer |
| CN996 | Polyether Urethane Acrylate | Sartomer |
| Ebecryl 8807 | Polyether urethane acrylate | Allnex |
| BR582E8 | Polyether urethane acrylate | Dymax |
| Genomer 4230 | Polyether urethane acrylate | Rhan |
| Isobornyl Acrylate (IBOA) | Acrylate Monomer | Sartomer |
| Genomer 1122 | Acrylate Monomer | Rahn |
| Isodecyl Acrylate | Acrylate Monomer | Sartomer |
| Polyvinylchloride (PVC) powder | Organic Filler | Formosa Plastics Corporation |
| Polypropylene Powder | Organic Filler | BYK |
| Zirconium Silicate Powder | Inorganic Filler | Continental Mineral Processing |

TABLE 1-continued

| Ingredient Name | Class | Supplier |
|---|---|---|
| Aluminium Silicate Powder | Inorganic Filler | Continental Mineral Processing |
| Aerosil R202 | Silane modified fumed silica (inorganic filler) | Evonik |
| Omnirad 184 | UV/Visible photoinitiator (PI) | IGM |
| Omnirad TPO | UV/Visible photoinitiator (PI) | IGM |
| Omnirad 1173 | UV/Visible photoinitiator (PI) | IGM |

Polyester Urethane Acrylate A is a flexible polyester urethane acrylate from the reaction of a saturated polyester diol and aliphatic diisocyanate, which is then capped with hydroxyacrylate.

Testing Methods

The following testing methods were employed in the examples described below.

Viscosity and Thixotropic Index

Viscosities were measured at shear rate 1 $s^{-1}$ and 10 $s^{-1}$ using cone and plate rheometer (Anton Paar). Thixotropic index was calculated as the ratio of viscosities at 1 $s^{-1}$ and 10 $s^{-1}$.

Chemical Resistance—Percent Weight Change

The photocurable composition was placed between two plastic sheets with 1 millimeter thick spacer and light cured for 30 seconds in a UV chamber with UV A light intensity of 100 mw/cm². The cured sheet was cut into a 20 millimeter long and 10 millimeter wide rectangular specimen. The specimen was then immersed in pH 1.5 hydrochloric acid solution or pH 12.5 sodium hydroxide solution for 2 to 4 weeks at 50° C. or 80° C.

After immersion, the specimen was rinsed with distilled water and dried at 50° C. for 4 hours. The percent weight change was calculated as the percent difference in weight of the specimen before and after immersion.

Shore D Hardness

Shore D hardness was measured per ASTM D2240. The tested material was placed between two PE films and covered with two glass plates to form 1 mm thick sheet, and then was cured using LED light with an intensity of 1.5 W/cm² on both sides of the glass plate. The cured sheet was then cut into 4 pieces and then stacked to be measured by Shore durometer.

Example 1—Photocurable Compositions with Various Polyether and Polyester Urethane Oligomers Photocurable formulations with various polyether and polyester urethane oligomers were formulated as shown below in Table 2.

TABLE 2

| | | Composition/Amt (wt %) | | | | |
|---|---|---|---|---|---|---|
| Ingredient | Class | 1-1 | 1-2 | 1-3 | 1-4 | 1-5 |
| CN 991 | Polyester | 56.4 | | | | |
| CN 9024 | Urethane | | 56.4 | | | |
| Polyester Urethane Acrylate A | Oligomer | | | | 47 | |
| Genomer 4230 | Polyether | | | 47 | | |
| Ebecryl 8807 | Urethane Oligomer | | | | | 47 |
| IBOA | Acrylate | 26.32 | 18.8 | 45.12 | 21.62 | 23.5 |
| Genomer 1122 | Monomer | | | | 23.5 | |
| Isodecyl Acrylate | | 9.4 | 16.92 | | | 21.62 |
| Omnirad 184 | Photoinitiator | 0.94 | 0.94 | 0.94 | 0.94 | 0.94 |
| Omnirad TPO | | 0.94 | 0.94 | 0.94 | 0.94 | 0.94 |
| Aerosil R202 | Inorganic Filler | 6 | 6 | 6 | 6 | 6 |
| Total | | 100 | 100 | 100 | 100 | 100 |

These formulations were cured and tested for rheology, shore hardness, and percent weight change. The results are shown below in Table 3.

TABLE 3

| | Composition | | | | |
|---|---|---|---|---|---|
| Tested Parameter | 1-1 | 1-2 | 1-3 | 1-4 | 1-5 |
| Viscosity at 1 $s^{-1}$ (mPa · s) | 127,200 | 50,030 | 45,780 | 160,700 | 88,870 |
| Viscosity at 10 $s^{-1}$ (mPa · s) | 16,980 | 8,417 | 9,304 | 33,080 | 13,950 |
| Thixotropic Index | 7.49 | 5.94 | 4.92 | 4.86 | 6.37 |
| Shore D Hardness | 68 | 58 | 37 | 55 | 50 |
| Percent Weight Change pH 1.5 2 Weeks Immersion | −1.02 | −2.58 | −0.63 | −9.55 | −0.37 |

TABLE 3-continued

| Tested Parameter | Composition | | | | |
|---|---|---|---|---|---|
| | 1-1 | 1-2 | 1-3 | 1-4 | 1-5 |
| Percent Weight Change pH 1.5 4 Weeks Immersion | −1.12 | −3.61 | −0.67 | −23.68 | −0.52 |
| Percent Weight Change pH 12.5 2 Weeks Immersion | −5.92 | −2.26 | −1.47 | −5.960 | −0.83 |
| Percent Weight Change pH 12.5 4 Weeks Immersion | −28.37 | −3.84 | −1.50 | −8.67 | −1.12 |

These results demonstrate that the photocurable compositions employing polyether urethane acrylates have better hydrolytic stability (chemical resistance) than polyester urethane acrylates, particularly when immersed in a pH 12.5 alkaline solution.

Example 2—Photocurable Compositions with Various Urethane Oligomers and Fillers

Photocurable formulations with various urethane oligomers and fillers were formulated as shown below in Table 4. For each urethane acrylate oligomer one organic filler and two inorganic fillers were compared.

TABLE 4

| Ingredient | Composition/Amt (wt %) | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| Polyester Urethane Acrylate A (Polyester UA) | 32.5 | | | 32.5 | | | 32.5 | | |
| CN 9024 (Polyester UA) | | 39 | | | 39 | | | 39 | |
| BR582 E8 (Polyether UA) | | | 32.5 | | | 32.5 | | | 32.5 |
| Isobornyl Acrylate (Monomer) | 14.95 | 13 | 14.95 | 14.95 | 13 | 14.95 | 14.95 | 13 | 14.95 |
| Genomer 1122 (Monomer) | 16.25 | 11.7 | 16.25 | 16.25 | 11.7 | 16.25 | 16.25 | 11.7 | 16.25 |
| Irgacure 1171 (PI) | 0.65 | 0.65 | 0.65 | 0.65 | 0.65 | 0.65 | 0.65 | 0.65 | 0.65 |
| Irgacure TPO (PI) | 0.65 | 0.65 | 0.65 | 0.65 | 0.65 | 0.65 | 0.65 | 0.65 | 0.65 |
| Aerosil R202 (Inorganic Filler) | 8 | 5 | 8 | 8 | 5 | 8 | 8 | 5 | 8 |
| PVC Powder (Organic Filler) | 30 | 30 | 30 | | | | | | |
| Zirconium Silicate Powder (Inorganic Filler) | | | | 30 | 30 | 30 | | | |
| Aluminium Silicate Powder (Inorganic Filler) | | | | | | | 30 | 30 | 30 |
| Total | 100 | 100 | 100 | 100 | 100 | 100 | 100 | 100 | 100 |

These formulations were cured and tested for rheology, shore hardness, and percent weight change. The results are shown below in Table 5.

TABLE 5

| Tested Parameter | Composition | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| Viscosity at 1 s$^{-1}$ (mPa · s) | 3,278 | 1,354 | 3,965 | 4,054 | 696 | 2,027 | 2,931 | 1,014 | 1,756 |
| Viscosity at 10 s$^{-1}$ (mPa · s) | 134 | 197 | 946 | 132 | 88 | 271 | 192 | 121 | 237 |
| Thixotropic Index | 24.46 | 6.87 | 4.19 | 30.71 | 7.91 | 7.48 | 15.27 | 8.38 | 7.41 |
| Shore D Hardness | 60 | 70 | 45 | 63 | 75 | 50 | | 75 | 52 |
| Percent Weight Change pH 1.5 4 Weeks Immersion | −7.03 | −1.45 | −0.18 | −2.37 | −2.46 | −1.26 | −2.87 | −2 | −1.31 |
| Percent Weight Change pH 12.5 4 Weeks Immersion | −2.38 | −2.25 | −1.2 | −7.98 | −14.19 | −4.48 | −5.23 | −5.00 | −2.90 |

Polyether urethane acrylate (BR582 E8) containing formulations (Compositions 2-3, 2-6, and 2-9) had less weight loss than the Polyester Urethane Acrylate A containing formulations (Compositions 2-1, 2-4, and 2-7) and polyester urethane acrylate (CN 9024) containing formulations (Compositions 2-2, 2-5, and 2-8) after immersion in both the pH 1.5 solution and after immersion in the pH 12.5 solution. The results are consistent with the conclusions in Example 1. The organic filler (polyvinylchloride powder) containing formulations (Compositions 2-1, 2-2, and 2-3) have less weight loss than zirconium silicate and aluminum silicate containing formulations (Compositions 2-4, 2-5, and 2-6 and 2-7, 2-8, and 2-9, respectively) in pH 12.5 solutions.

Example 3—Photocurable Compositions with Various Polyether Urethane Oligomers and Organic Fillers Photocurable formulations with various polyether urethane oligomers and organic fillers were formulated as shown below in Table 6.

TABLE 6

| Ingredient | Class | Composition/Amt (wt %) | | | |
|---|---|---|---|---|---|
| | | 3-1 | 3-2 | 3-3 | 3-4 |
| CN 9167US | Polyether | 33 | | | |
| CN 996 | Urethane | | 39.6 | | |
| Genomer 4230 | Oligomer | | | 32.5 | 32.5 |
| IBOA | Acrylate Monomer | 18.48 | 15.18 | 31.2 | 31.2 |
| Isodecyl Acrylate | | 13.2 | 9.9 | | |
| Omnirad 184 | Photoinitiator | 0.66 | 0.66 | 0.65 | 0.65 |
| Omnirad TPO | | 0.66 | 0.66 | 0.65 | 0.65 |
| Aerosil R202 | Inorganic Filler | 4 | 4 | 5 | 5 |
| Polyvinylchloride Powder | Organic Filler | 30 | 30 | 30 | |
| Polypropylene Powder | | | | | 30 |
| Total | | 100 | 100 | 100 | 100 |

These formulations were cured and tested for rheology, shore hardness, and percent weight change. The results are shown below in Table 7.

TABLE 7

| Tested Parameter | Composition | | | |
|---|---|---|---|---|
| | 3-1 | 3-2 | 3-3 | 3-4 |
| Viscosity at 1 s$^{-1}$ (mPa · s) | 158,200 | 200,000 | 253,200 | 256,000 |
| Viscosity at 10 s$^{-1}$ (mPa · s) | 29,370 | 46,790 | 35,720 | 34,460 |
| Thixotropic Index | 5.39 | 4.26 | 7.09 | 7.43 |
| Shore D Hardness | 78 | 65 | 45 | 45 |
| Percent Weight Change pH 1.5 2 Weeks Immersion | −0.30 | −0.42 | −0.31 | −0.33 |
| Percent Weight Change pH 1.5 4 Weeks Immersion | −0.32 | −0.47 | −0.47 | −0.44 |
| Percent Weight Change pH 12.5 2 Weeks Immersion | −0.48 | −0.96 | −1.16 | −0.62 |
| Percent Weight Change pH 12.5 4 Weeks Immersion | −0.79 | −1.32 | −1.33 | −0.64 |

These results demonstrate that photocurable compositions employing polyether urethane acrylates and organic fillers have good hydrolytic stability (chemical resistance) after immersion in both the pH 1.5 solution at 50° C. and after immersion in the pH 12.5 solution at 50° C.

Example 4—Photocurable Compositions with Various Polyether Urethane Oligomer to Acrylate Monomer Ratios Photocurable formulations with various polyether urethane oligomer to acrylate monomer ratios were formulated as shown below in Table 8.

TABLE 8

| Ingredient | Class | Composition/Amt (wt %) | | |
|---|---|---|---|---|
| | | 4-1 | 4-2 | 4-3 |
| Genomer 4230 | Polyether Urethane Oligomer | 55 | 20 | 37.5 |
| IBOA | Acrylate Monomer | 20 | 55 | 37.5 |
| Omnirad 184 | Photoinitiator | 0.5 | 0.5 | 0.5 |
| Omnirad TPO | | 0.5 | 0.5 | 0.5 |
| Aerosil R202 | Inorganic Filler | 4 | 4 | 4 |
| Polypropylene Powder | Organic Filler | 20 | 20 | 20 |
| Total | | 100 | 100 | 100 |

These formulations were cured and tested for rheology, shore hardness, and percent weight change. The results are shown below in Table 9.

TABLE 9

| Tested Parameter | Composition | | |
|---|---|---|---|
| | 4-1 | 4-2 | 4-3 |
| Viscosity at 1 s$^{-1}$ (mPa · s) | 107,200 | 22,820 | 52,880 |
| Viscosity at 10 s$^{-1}$ (mPa · s) | 30,290 | 3,672 | 9,546 |

TABLE 9-continued

| Tested Parameter | Composition | | |
|---|---|---|---|
| | 4-1 | 4-2 | 4-3 |
| Thixotropic Index | 3.54 | 6.21 | 5.54 |
| Shore D Hardness | 24 | 70 | 49 |
| Percent Weight Change pH 1.5 2 Weeks Immersion | −0.49 | −0.11 | −0.32 |
| Percent Weight Change pH 1.5 4 Weeks Immersion | −0.45 | −0.12 | −0.30 |
| Percent Weight Change pH 12.5 2 Weeks Immersion | −0.56 | −0.19 | −0.25 |
| Percent Weight Change pH 12.5 4 Weeks Immersion | −0.43 | −0.16 | −0.19 |

These results demonstrate that photocurable compositions with various polyether urethane oligomer to acrylate monomer ratios all have good hydrolytic stability (chemical resistance) after immersion in both the pH 1.5 solution at 50° C. and after immersion in the pH 12.5 solution at 50° C.

Example 5—Photocurable Compositions with Polyether Urethane Oligomer and Various Organic Fillers Photocurable formulations with polyether urethane oligomer and various organic fillers were formulated as shown below in Table 10.

TABLE 10

| Ingredient | Resin | 5-1 | 5-2 | 5-3 | 5-4 | 5-5 | 5-6 | 5-7 |
|---|---|---|---|---|---|---|---|---|
| Genomer 4230 (Polyether UA) | 50 | 47 | 26 | 33 | 40 | 26 | 33 | 40 |
| Isobornyl Acrylate (Monomer) | 48 | 45.12 | 24.96 | 31.68 | 38.4 | 24.96 | 31.68 | 38.4 |
| Omnirad 184 (PI) | 1 | 0.94 | 0.52 | 0.66 | 0.8 | 0.52 | 0.66 | 0.8 |
| Omnirad (PI) | 1 | 0.94 | 0.52 | 0.66 | 0.8 | 0.52 | 0.66 | 0.8 |
| Aerosil R202 (Inorganic Filler) | | 6 | 3 | 4 | 5 | 3 | 4 | 5 |
| Polypropylene Powder (Organic Filler) | | | 45 | 30 | 15 | | | |
| PVC Powder (Organic Filler) | | | | | | 45 | 30 | 15 |
| Total | 100 | 100 | 100 | 100 | 100 | 100 | 100 | 100 |

These formulations were cured and tested for rheology, shore hardness, and percent weight change. The results are shown below in Table 11.

TABLE 11

| Tested Parameter | Resin | 5-1 | 5-2 | 5-3 | 5-4 | 5-5 | 5-6 | 5-7 |
|---|---|---|---|---|---|---|---|---|
| Viscosity at 1 $s^{-1}$ (mPa · s) | 729 | 45,200 | 1,133,000 | 92,710 | 49,600 | 433,400 | 125,200 | 52,750 |
| Viscosity at 10 $s^{-1}$ (mPa · s) | 695 | 8,331 | 246,600 | 15,600 | 9,237 | 46,010 | 19,370 | 9,579 |
| Thixotropic Index | 1.05 | 5.43 | 4.56 | 5.94 | 5.37 | 9.42 | 6.46 | 5.51 |
| Shore D Hardness | 25 | 38 | 51 | 48 | 41 | 50 | 45 | 40 |
| Percent Weight Change pH 1.5 2 Weeks Immersion | −0.66 | −0.46 | −0.18 | −0.32 | −0.4 | 1.24 | 0.61 | −0.08 |
| Percent Weight Change pH 1.5 4 Weeks Immersion | −0.62 | −0.46 | −0.21 | −0.32 | −0.39 | 1.25 | 0.60 | −0.09 |
| Percent Weight Change pH 12.5 2 Weeks Immersion | −0.91 | −0.72 | −0.20 | −0.37 | −0.47 | 1.08 | 0.37 | −0.36 |
| Percent Weight Change pH 12.5 4 Weeks Immersion | −0.86 | −0.72 | −0.22 | −0.34 | −0.42 | 1.05 | 0.26 | −0.48 |

These results demonstrate that photocurable compositions with no fillers or various organic fillers in different range all have good hydrolytic stability (chemical resistance) after immersion in both the pH 1.5 solution at 50° C. and after immersion in the pH 12.5 solution at 50° C. However, organic filler amount in the formulation affects the viscosity. In Example 5-6 and 5-6, the weight change is positive because the filler absorbs water and water was not completely removed in the specified testing method.

These results demonstrate that photocurable compositions with various amounts of organic filler all have good hydrolytic stability (chemical resistance) after immersion in both the pH 1.5 solution at 50° C. and after immersion in the pH 12.5 solution at 50° C.

What is claimed is:

1. A photocurable composition comprising:
   a) a (meth)acrylate-functionalized polyether urethane component, wherein the (meth)acrylate-functionalized polyether urethane component is present in an amount of about 20% to about 60% by weight based on the total weight of the curable composition;
   b) a (meth)acrylate monomer;
   c) an organic filler; and
   d) a photoinitiator,
   wherein when exposed to UV or visible light the curable composition forms a cured reaction product, the cured reaction product demonstrates a loss of mass of: 1) less than 2% when exposed to acidic, aqueous conditions of a pH=1.5 for about 4 weeks at a temperature of about 50° C. and/or 2) less than 3% when exposed to basic, aqueous conditions of a pH=12.5 for about 4 weeks at a temperature of about 50° C.

2. The curable composition of claim 1, wherein the cured reaction product has a Shore D hardness of about 20 or greater.

3. The curable composition of claim 1, wherein the curable composition has a viscosity of about 10,000 to about 100,000 cps.

4. The curable composition of claim 1, wherein the curable composition has a thixotropic index of about 1.5 to about 6.

5. The curable composition of claim 1, wherein the (meth)acrylate-functionalized polyether urethane component is a polyether urethane acrylate oligomer.

6. The curable composition of claim 1, wherein the (meth)acrylate monomer is present in an amount of about 10% to about 60% by weight based on the total weight of the curable composition.

7. The curable composition of claim 1, wherein the (meth)acrylate monomer is a polyethylene glycol diacrylate.

8. The curable composition of claim 1, wherein the organic filler is present in an amount of about 0.1% to about 40% by weight based on the total weight of the curable composition.

9. The curable composition of claim 1, wherein the organic filler is a hydrophobic polyolefin-based organic thickener.

10. The curable composition of claim 1, wherein the organic filler is selected from the group consisting of polyvinylchloride powder, polypropylene powder, and combinations thereof.

11. The curable composition of claim 1, wherein the photoinitiator is present in an amount of about 0.2% to about 5% by weight based on the total weight of the curable composition.

12. The curable composition of claim 1, wherein the photoinitiator is a polymeric structure to which is attached at least one chromophore that is excited by radiation in the UV light or visible light range.

13. A composite membrane structure comprising:
    a) a membrane comprising at least one surface; and
    b) the cured reaction product of the curable composition of claim 1 disposed on at least a portion of the at least one surface of the membrane.

14. The composite membrane structure of claim 13, wherein the cured reaction product is adhesively bonded to at least a portion of the at least one surface of the membrane.

15. The composite membrane structure of claim 13, wherein the cured reaction product is disposed on at least a portion of the at least one surface of the membrane in a pre-determined pattern.

16. The composite membrane structure of claim 15, wherein the pre-determined pattern is selected from the group consisting of stripes, waves, circles, ovals, arcs, squares, rectangles, diamonds, pentagons, hexagons, stars, chevrons, a random pattern, and combinations thereof.

17. A method of a producing a hydrolytically stable cured reaction product comprising the steps of:
    a) providing a curable composition comprising:
       i) a (meth)acrylate-functionalized polyether urethane component, wherein the (meth)acrylate-functionalized polyether urethane component is present in an amount of about 20% to about 60% by weight based on the total weight of the curable composition;
       ii) a (meth)acrylate monomer;
       iii) an organic filler; and
       iv) a photoinitiator, and
    b) exposing the curable composition to a source of UV or visible light to form a cured reaction product,
wherein hydrolytic stability is demonstrated when the cured reaction product demonstrates a loss of mass of: 1) less than 2% when exposed to acid, aqueous conditions of a pH=1.5 for about 4 weeks at a temperature of about 50° C. or 2) less than 3% when exposed to basic, aqueous conditions of a pH=12.5 for about 4 weeks at a temperature of about 50° C.

18. The method of claim 17, wherein the cured reaction product has a Shore D hardness of about 20 or greater.

19. The method of claim 17, wherein the (meth)acrylate-functionalized polyether urethane component is a polyether urethane acrylate oligomer.

20. The method of claim 17, wherein the (meth)acrylate monomer is present in an amount of about 10% to about 60% by weight based on the total weight of the curable composition.

21. The method of claim 17, wherein the (meth)acrylate monomer is a polyethylene glycol diacrylate.

22. The method of claim 17, wherein the organic filler is present in an amount of about 0.1% to about 40% by weight based on the total weight of the curable composition.

23. The method of claim 17, wherein the organic filler is a hydrophobic polyolefin-based organic thickener.

24. The method of claim 19, wherein the organic filler is selected from the group consisting of polyvinylchloride powder, polypropylene powder, and combinations thereof.

25. The method of claim 17, wherein the photoinitiator is present in an amount of about 0.2% to about 5% by weight based on the total weight of the curable composition.

26. The method of claim 17, wherein the photoinitiator has a polymeric structure to which is attached at least one chromophore that is excited by radiation in the UV light or visible light range.

* * * * *